Patented Mar. 7, 1933

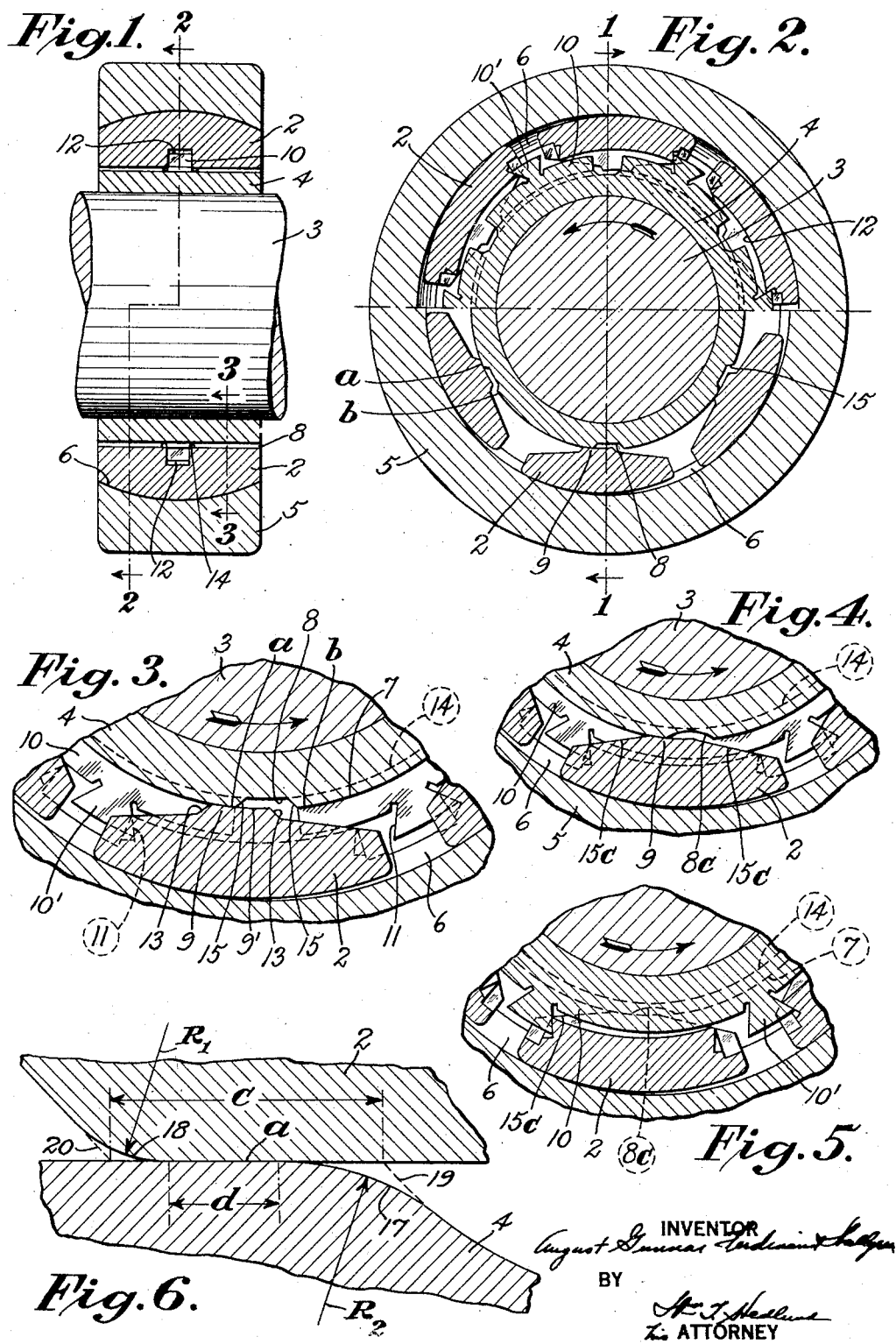

1,900,875

UNITED STATES PATENT OFFICE

AUGUST GUNNAR FERDINAND WALLGREN, OF STOCKHOLM, SWEDEN, ASSIGNOR TO AKTIEBOLAGET NOMY, OF STOCKHOLM, SWEDEN, A CORPORATION OF SWEDEN

BEARING

Application filed June 16, 1931, Serial No. 544,767, and in Sweden June 21, 1930.

My invention relates to bearings and more particularly to bearings of the type disclosed in my copending application Serial No. 277,769, filed May 14, 1928, Pat. No. 1,871,485, granted August 16, 1932. Bearings of this type are adapted to sustain loads of great magnitude by the formation of wedge shaped oil films between a plurality of blocks and a surface on which the blocks slide. The blocks are tiltable, having asymmetrical positions with respect to transverse grooves, projecting portions resting on or adjacent one or the other edge, respectively, of the grooves.

The present invention has for its object to improve bearings of this type by altering the projections on the blocks and the grooves in order to facilitate the shifting of the blocks with respect to the tilting edges or bearing shoulders on reversal of rotation and to facilitate starting from rest. This is accomplished by inclining and preferably rounding the shoulders or edges which provide the tilting fulcrum surfaces.

The invention will be explained by reference to the accompanying drawing showing several forms of bearing structure embodying the invention, which drawing is to be considered as a part of this specification, and on which:

Fig. 1 is an axial cross-sectional view, taken on the line 1—1 of Fig. 2, of a bearing embodying the invention;

Fig. 2 is a transverse sectional view taken on the line 2—2 of Fig. 1;

Fig. 3 is a sectional view, on enlarged scale, taken on the line 3—3 of Fig. 1;

Fig. 4 is a view similar to Fig. 3 of another form of bearing embodying the invention;

Fig. 5 is a center transverse sectional view of the bearing shown in Fig. 4; and Fig. 6 shows a part of a block and a part of a cooperating member having still another form and embodying the invention.

The bearing shown in Figs. 1, 2 and 3 comprises a plurality of bearing blocks 2 positioned radially between an inner member 4 fixed to the shaft 3 and an outer stationary member 5. The outer member 5 is provided with an inner spherical bearing surface 6. The blocks are provided with outer bearing surfaces which slide on the spherical surface 6 and are shaped to correspond thereto, there being an oil film between the blocks and the spherical surface 6. The inner member 4 is provided with a plurality of axially extending grooves 8, at the edges of which on the outer surface 7 of the inner member 4 are the fulcrum or tilting edges or bearing shoulders $a$ and $b$.

The inner member 4 is also provided with centrally disposed and peripherally extending guide members 10. The guide members 10 may be said to constitute a peripheral ring cut at the recesses or grooves 8. Each guide member 10 has a central portion 10' providing abutment surfaces 11 which engage surfaces at the ends of the blocks and cause the blocks to travel with the member 4. The block is so shaped and the abutment surfaces 11 are so disposed that the block has limited peripheral movement between the abutment surfaces.

Each block has a central projection 9 terminating in a surface 9'. The peripheral movement is such that when the block is at one extreme position, one edge of surface 9' contacts the bearing shoulder $a$ and the other edge of surface 9 is unsupported and adapted to enter the groove 8. This tilts the block so that the forward end is raised somewhat from the spherical surface 6. In the other extreme position of the block, the opposite lateral portion of the projection 9 contacts the bearing shoulder $b$, and the portion previously referred to as contacting at $a$ is then free to enter groove 8, thus tilting the block in opposite sense.

The blocks are provided with peripherally extending grooves 12 into which the guide members 10 enter. The guide members 10 and the peripheral grooves 12 serve to hold the parts in axial alignment and serve to take up a limited amount of axial thrust. Peripheral grooves 14 may be provided at the sides of the guide members 10 in order to facilitate finishing the cylindrical surface 7.

In accordance with the invention the sides 15 of groove 8 are inclined so that the groove is narrower at the bottom. The sides of the grooves 8 are radially inclined and may be said to converge radially inwardly. Each side forms an angle with the adjacent bearing shoulder which is greater than a right angle, so that the angularity between the side of the groove and the bearing shoulder surface is less abrupt than a right angle. The purpose of this is to facilitate the movement of the projection 9 of the block from within the recess or groove 8 onto the bearing shoulder. Considering Fig. 3, if the rotation is reversed so that the right-hand portion of the projection 9 (as shown) is to slide up (radially outward) onto the bearing shoulder $b$, it will be seen that if the right-hand edge of projection 9 strikes the right-hand surface 15, it will readily slide up onto the bearing shoulder $b$ on account of the inclination from radial of the surface 15. It will be obvious that this movement up onto the shoulder is no as easy if the side of the groove is at right angles to the surface $b$. The same advantage is obtained when the shaft starts rotating from a position of rest. The position of the blocks may be such that a portion of a block projects into a groove 8. The inclination of the side 15 of the groove facilitates sliding the block onto the proper bearing shoulder. The sides 13 of the projection 9 may likewise be inclined at an obtuse angle with respect to the surface 9', thereby further facilitating the sliding of the projection 9 onto the bearing shoulder. Thus the sides of projection 9 are inclined so that they converge outwardly with respect to the block. With the present invention, the blocks are certain to leave the recesses when reversal takes place and properly shift position and they cannot be prevented from obtaining proper position by having the side of the projection engage against the side of the groove 8.

Instead of forming the grooves 8 with flat or substantially flat bottom and side surfaces, they may be formed as shown in Figs. 4 and 5, at 8c, of one continuous curved surface. Grooves of this shape may be readily formed by grinding, thus facilitating manufacture. Furthermore, the projections 9 may be formed by a single inclined surface at each end of the block as shown at 15c in Figs. 4 and 5.

With the sides of the grooves 8 extending radially so that the bearing shoulders meet the sides of the grooves at right angles, it has been found that fracture of the bearing shoulders has occurred due to heavy load. With the side surfaces of the grooves inclined as shown in both the embodiments of Fig. 1 and Fig. 4, fracture at the edge of the bearing shoulder is obviated, and consequently larger loads can be carried for a given width of bearing shoulder.

The principle of the invention is carried a step further in Fig. 6, wherein the angular meeting line of the bearing shoulder and the side of the groove is eliminated by producing a curvature at 17 on the member 4 and a curvature at 18 on the block 2. Thus there is a smooth curved surface all the way from the bearing shoulder $a$ along the sides and bottom of the recess 8 and to the opposite bearing shoulder $b$. Also, the projection 9 is rounded at both sides. The surfaces 17 and 18 may be swung about radii $R_1$ and $R_2$ which should be not less than 0.25 times the distance $c$ and should not exceed double the distance $c$. It will be evident that the width $d$ of the bearing shoulder may be of any desired value within the limitations above prescribed. With this arrangement I believe that the best contact and best force distribution at the bearing shoulder may be had. The two dotted lines 19 and 20 indicate the form of groove 8 and projection edge before rounding the edges. That is, these lines indicate the form of structure shown in Fig. 4.

It will be understood that the invention may be embodied in other forms than those specifically illustrated and described.

What I claim is:

1. A bearing of the character described comprising relatively rotatable spaced bearing members and a plurality of bearing blocks having operative positions between said members, one of said members having grooves to form bearing shoulders adjacent to the grooves, said grooves being disposed transversely of the direction of movement of the bearing, said blocks having projections cooperating with said bearing shoulders to tilt the blocks, and said grooves having converging sides whereby the angularity between the groove surfaces and the bearing shoulders is less abrupt than a right angle.

2. A bearing of the character described comprising relatively rotatable spaced bearing members and a plurality of bearing blocks having operative positions between said members, one of said members having grooves to form bearing shoulders adjacent to the grooves, said grooves being disposed transversely of the direction of movement of the bearing, said blocks having projections cooperating with said bearing shoulders to tilt the blocks, and said grooves having curved side surfaces adjacent the bearing shoulders whereby the angularity between the groove surfaces and the bearing shoulders is less abrupt than a right angle.

3. A bearing of the character described comprising relatively rotatable spaced bearing members and a plurality of bearing blocks having operative positons between said members, one of said members having grooves to form bearing shoulders adjacent to the grooves, said grooves being disposed transversely of the direction of movement of the bearing, said blocks having projections cooperating with said bearing shoulders to tilt the blocks, and said projections having outwardly converging sides.

4. A bearing of the character described comprising relatively rotatable spaced bearing members and a plurality of bearing blocks having operative positions between said members, one of said members having grooves to form bearing shoulders adjacent to the grooves, said grooves being disposed transversely of the direction of movement of the bearing, said blocks having projections cooperating with said bearing shoulders to tilt the blocks, and said projections having curved outwardly converging sides.

5. A bearing of the character described comprising relatively rotatable spaced bearing members and a plurality of bearing blocks having operative positions between said members, one of said members having grooves to form bearing shoulders adjacent to the grooves, said grooves being disposed transversely of the direction of movement of the bearing, said blocks having projections cooperating with said bearing shoulders to tilt the blocks, and said projections and said grooves being rounded to facilitate movement of the sides of the projections from within the grooves onto the bearing shoulders.

6. A bearing of the character described comprising relatively rotatable spaced bearing members and a plurality of bearing blocks having operative positions between said members, one of said members having grooves to form bearing shoulders adjacent to the grooves, said grooves being disposed transversely of the directional movement of the bearing, said blocks having projections cooperating with said bearing shoulders to tilt the blocks, and said projections and said grooves having radially inclined sides to facilitate movement of the sides of the projections from within the grooves onto the bearing shoulders.

7. A bearing of the character described comprising relatively rotatable spaced bearing members and a plurality of bearing blocks having operative positions between said members, one of said members having grooves to form bearing shoulders adjacent to the grooves, said grooves being disposed transversely of the direction of movement of the bearing, said blocks having projections cooperating with said bearing shoulders to tilt the blocks, said grooves having converging sides such that the angularity between the groove surfaces and the bearing shoulders is less abrupt than a right angle, and said projections having outwardly converging sides.

In testimony whereof I have affixed my signature.

AUGUST GUNNAR FERDINAND WALLGREN.